INVENTOR.
WILLIAM FLYNN

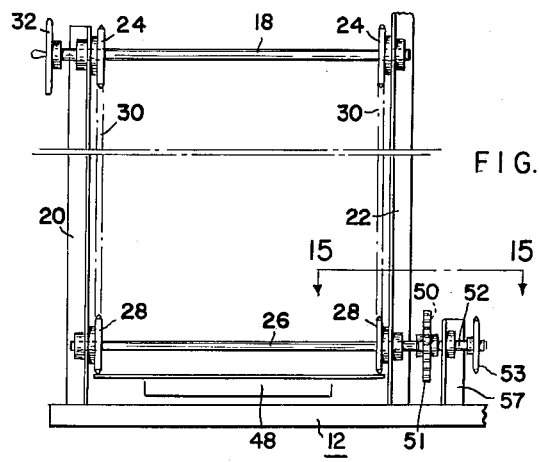
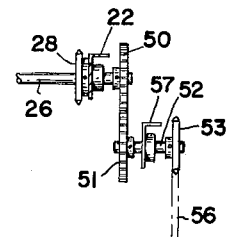
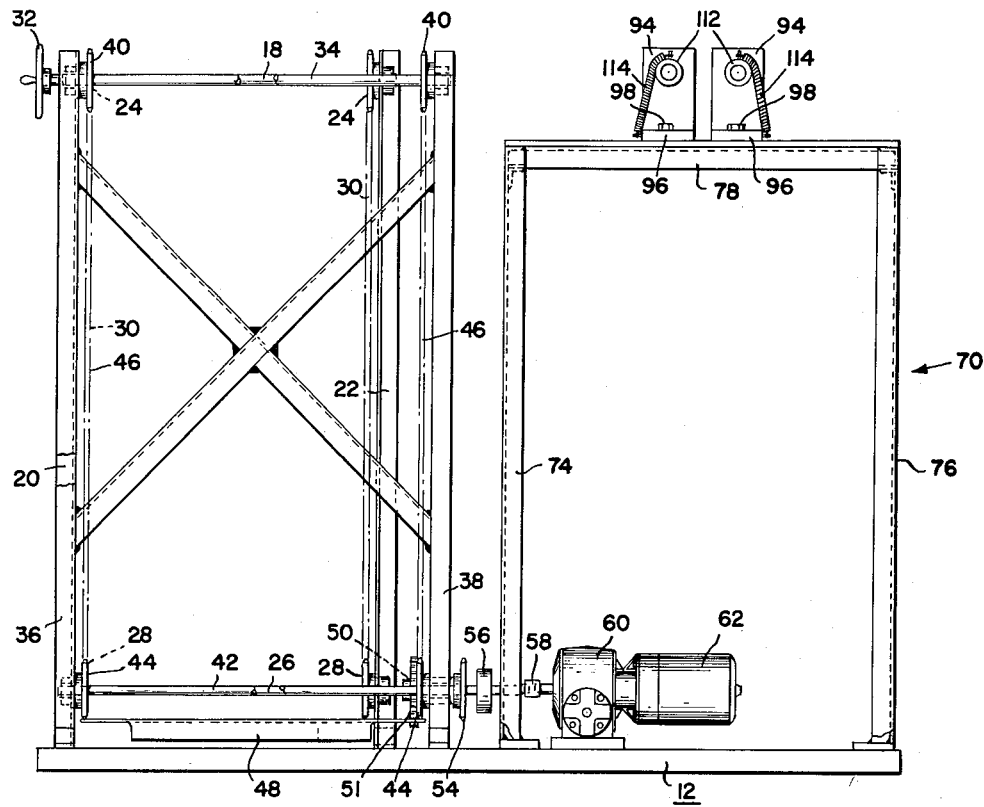
FIG. 14.
FIG. 15.
FIG. 2.
INVENTOR.
WILLIAM FLYNN

INVENTOR.
WILLIAM FLYNN
BY
ATTORNEYS

INVENTOR.
WILLIAM FLYNN

March 20, 1962 W. FLYNN 3,025,769
BOX MAKING MACHINE
Filed April 18, 1960 10 Sheets-Sheet 5

INVENTOR.
WILLIAM FLYNN
BY
Bresser, Smith & Harding
ATTORNEYS

INVENTOR.
WILLIAM FLYNN

March 20, 1962 W. FLYNN 3,025,769
BOX MAKING MACHINE
Filed April 18, 1960 10 Sheets-Sheet 8

INVENTOR.
WILLIAM FLYNN
BY
Busser, Smith & Harding
ATTORNEYS

United States Patent Office 3,025,769
Patented Mar. 20, 1962

3,025,769
BOX MAKING MACHINE
William Flynn, Philadelphia, Pa., assignor to Metal Edge Industries, Barrington, N.J., a corporation of Pennsylvania
Filed Apr. 18, 1960, Ser. No. 23,061
18 Claims. (Cl. 93—44.1)

This invention relates generally to box making machines, and particularly to improvements in machines for folding up the side panels of blanks that are cornered and scored for folding.

An object of the invention is to provide such a machine capable of folding the side panels of a blank without any substantial sliding of the folders across the surfaces of the side panels.

Another object is to provide such a machine arranged for causing the blanks to approach the folders flatwise instead of edgewise.

Another object is to provide such a machine with folders capable, without any change of parts, of folding up the side panels of blanks varying in size and shape within a very wide range.

Another object is to provide such a machine with mandrels which present the blanks to the folders and actuate the folders for folding all the side panels of a blank over one mandrel through approximately 120 degrees.

Another object is to provide such a machine wherein the folders are automatically restored to their initial positions when released by the mandrels.

Another object is to provide such a machine responsive to removal of a blank from a stack of blanks being fed to the machine for automatically advancing the stack of blanks.

Other objects of the invention will become apparent when the following description is read with reference to the accompanying drawings, in which:

FIGURE 2 is a side elevation of the machine, as indicated by line 2—2 of FIGURE 1;

FIGURE 14 is a section on the vertical plane indicated by the line 14—14 of FIGURE 1; and FIGURE 15 is a section on the horizontal plane indicated by the line 15—15 of FIGURE 14.

Figure 1:
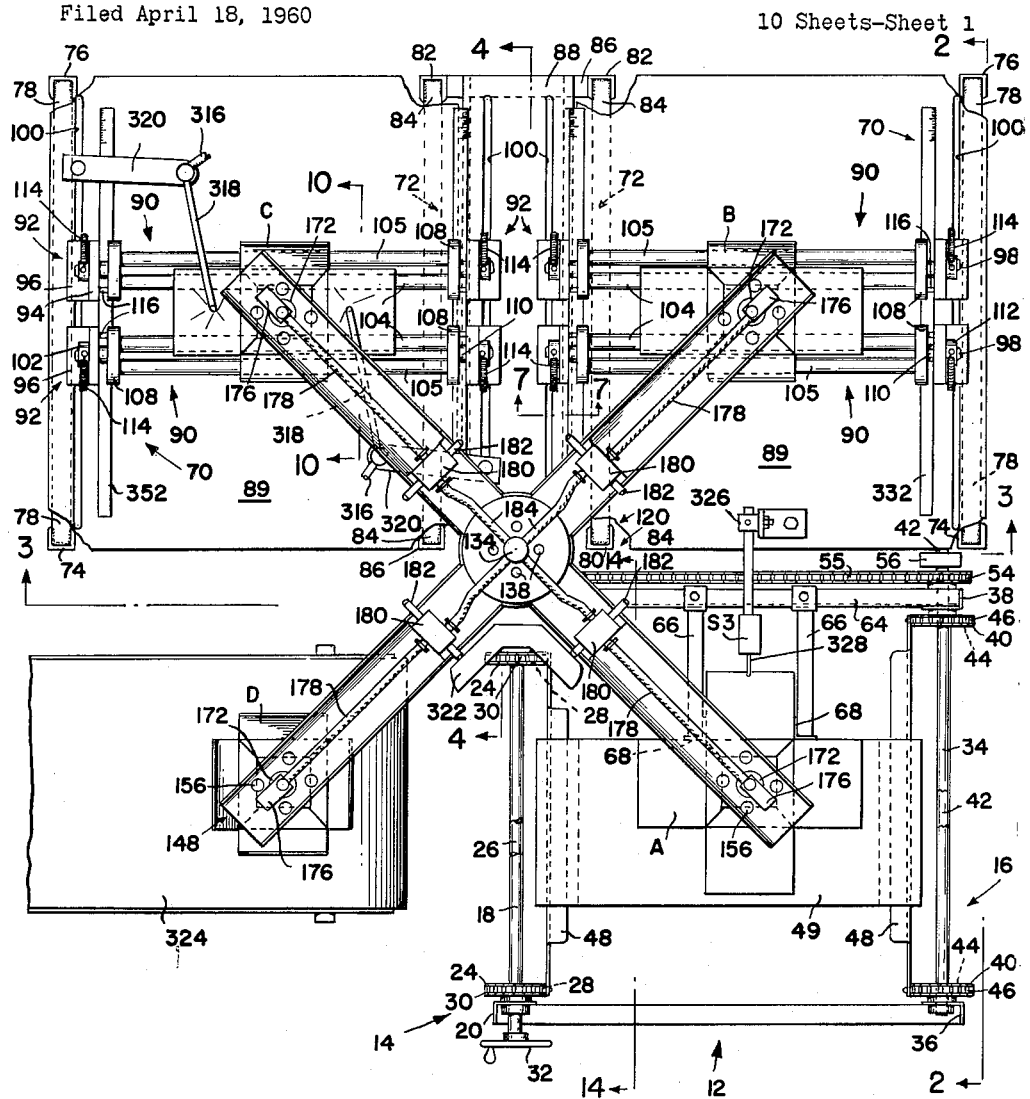
FIGURE 1 is a plan view of a box making machine embodying the invention.
Figure 3:
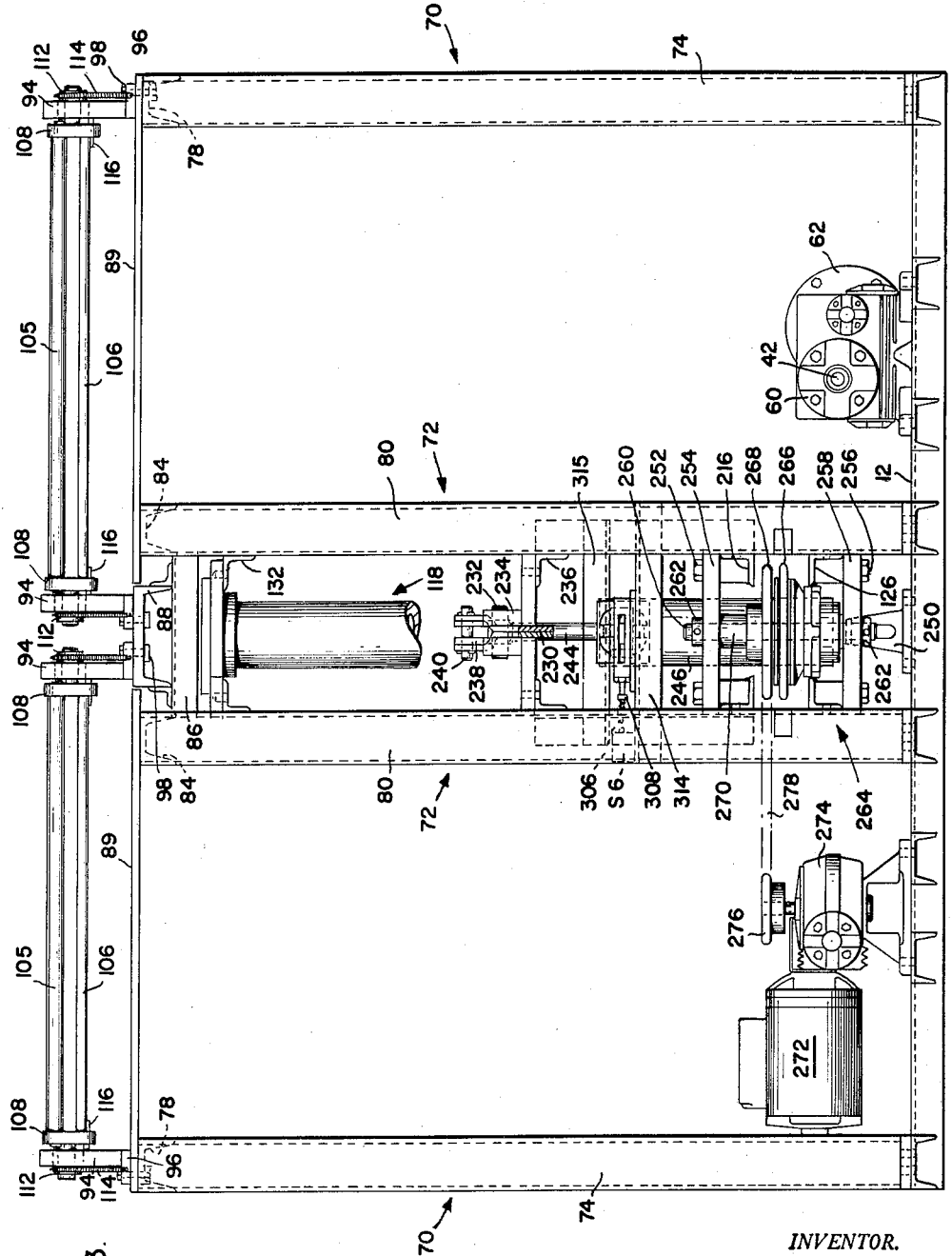
FIGURE 3 is an enlarged section on the vertical plane indicated by line 3—3 of FIGURE 1.

A machine constructed in accordance with the invention comprises a rigid framework including a generally rectangular horizontally extending bed or frame section 12 which mounts a pair of laterally spaced bents or frame sections 14 and 16. At the upper end of the bent 14 is a horizontally extending shaft 18 having opposite end portions journalled respectively in the upright posts 20 and 22. Mounted upon the shaft 18 is a pair of axially spaced chain sprockets 24. At the lower end of the bent 14 is a horizontally extending shaft 26 having opposite end portions journalled respectively in posts 20 and 22. Mounted upon the shaft 26 is a pair of axially spaced chain sprockets 28. Trained over each sprocket 24 and a sprocket 28 is a chain 30. The shaft 18 is provided with a hand wheel 32 located at the front of the machine within easy reach of the operator.

At the upper end of the bent 16 is a horizontally extending shaft 34 having opposite end portions journalled respectively in posts 36 and 38. Mounted upon the shaft 34 is a pair of chain sprockets 40. At the lower end of the bent 16 is a horizontally extending shaft 42 having opposite end portions journalled in posts 36 and 38. Mounted upon the shaft 42 is a pair of chain sprockets 44. Trained over each sprocket 40 and a sprocket 44 is a chain 46. Secured to the pair of chains 30 is a horizontally extending support bar 48, and secured to the pair of chains 46 is a second horizontally extending support bar 48. Carried by these support bars is a horizontally extending elevator platform 49.

Mounted upon one end portion of the shaft 26 is a gear 50 which meshes with a gear 51 mounted upon a shaft 52 journalled in a short post 57. The shaft 52 also mounts a chain sprocket 53. Trained over the sprocket 53 and a sprocket 54 mounted upon the shaft 42 is a chain 55. Also mounted upon the shaft 42 is a solenoid operated clutch 56. The shaft 42 is coupled, as at 58, to the output shaft of a change speed device 60 operated by an electric motor 62.

Carried by the bents 14 and 16 is a horizontally extending crossbar 64 having opposite end portions affixed respectively to posts 22 and 38. Slidably mounted upon this crossbar is a pair of brackets 66 adjustably fixed in position, and depending from these brackets is a pair of laterally spaced guide bars 68.

In the rear of the machine on each side thereof is a pair of upright laterally spaced frame sections 70 and 72. The frame section 70 comprises a pair of opposite side posts 74 and 76 and a cross member 78, while the frame section 72 comprises a pair of opposite side posts 80 and 82 and a cross member 84. Between the frame sections 72 is a horizontally extending bar 86 having opposite end portions secured respectively to the posts 80 and a second horizontally extending bar 86 having opposite end portions secured respectively to the posts 82. These bars 86 carry a channel member 88, and extending over the several bents 70 and 72 and the channel member 88 is a cover plate designated 89.

Overlying plate 89 are four folders, generally designated 90. These folders extend across the machine and are arranged in pairs respectively on the right and the left-hand sides of the machine.

Figure 9:
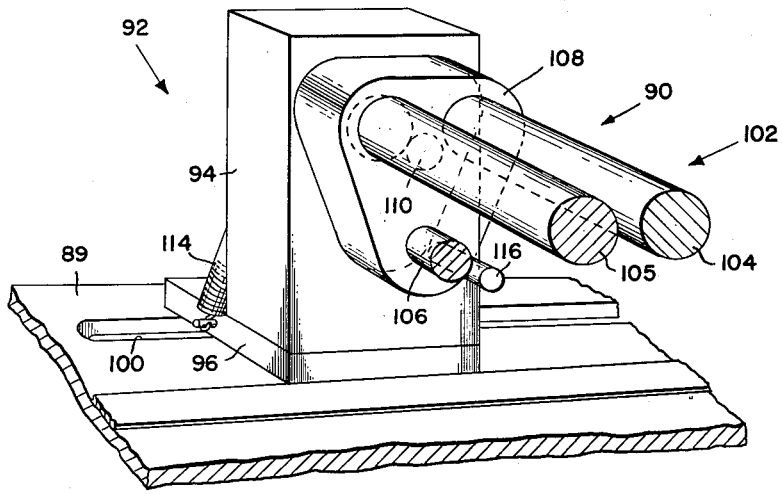
FIGURE 9 is a perspective view of the end of the folder device shown in FIGURES 7 and 8.
Figures 7, 8:
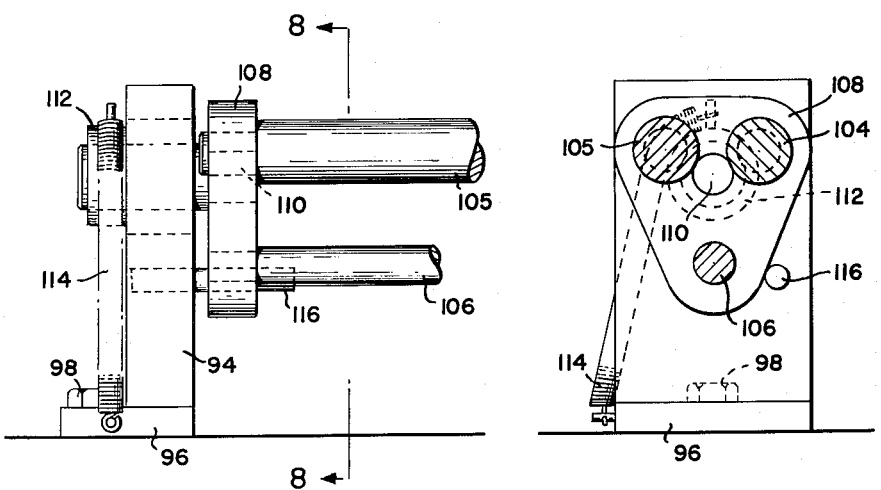
FIGURE 7 is an enlarged section on the vertical plane indicated by line 7—7 of FIGURE 1.
FIGURE 8 is a section on the vertical plane indicated by line 8—8 of FIGURE 7.
Figure 10:
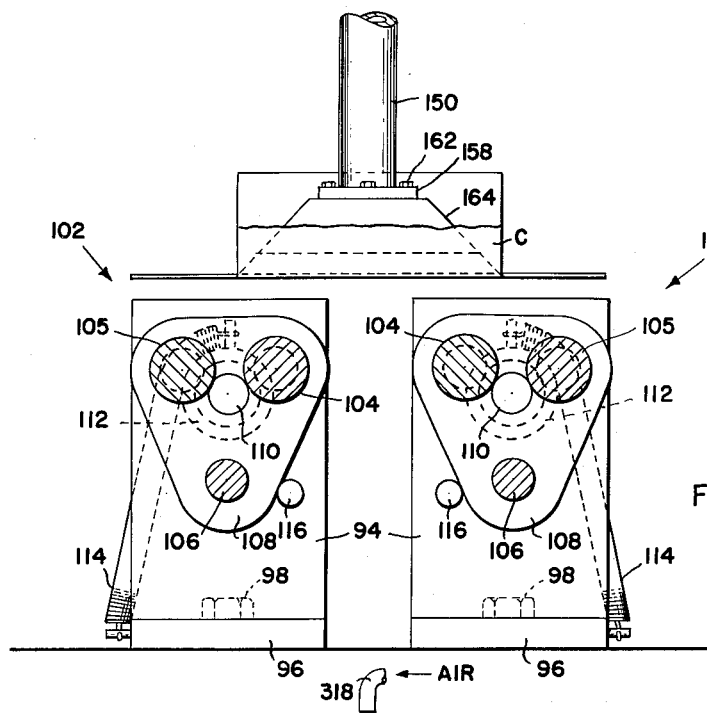
FIGURE 10 is an enlarged section on the vertical plane indicated by line 10—10 of FIGURE 1, showing opposite side panels of a blank about to be folded.
Figure 11:
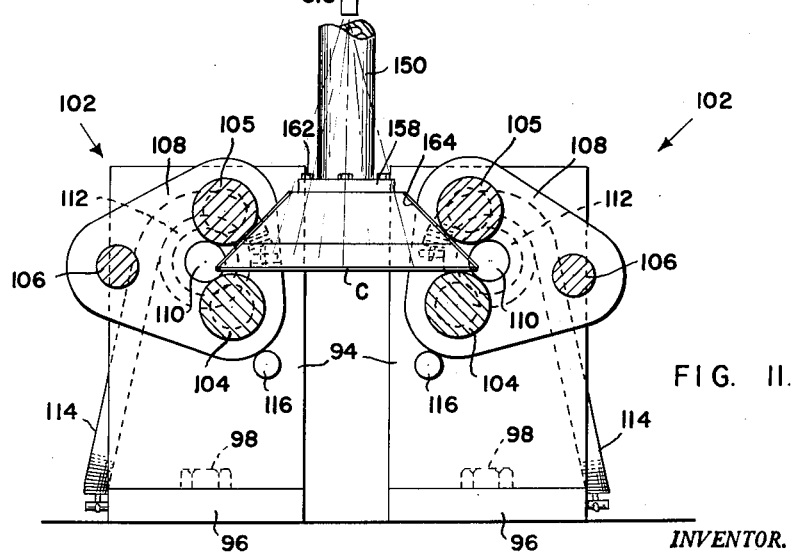
FIGURE 11 is similar to FIGURE 10, but shows the opposite side panels being folded.
Figure 12:
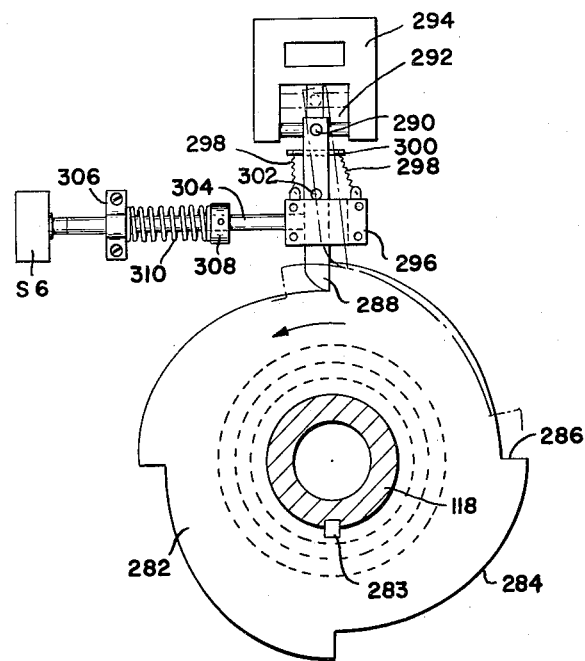
FIGURE 12 is an enlarged section on the horizontal plane indicated by line 12—12 of FIGURE 4.
Figure 13:
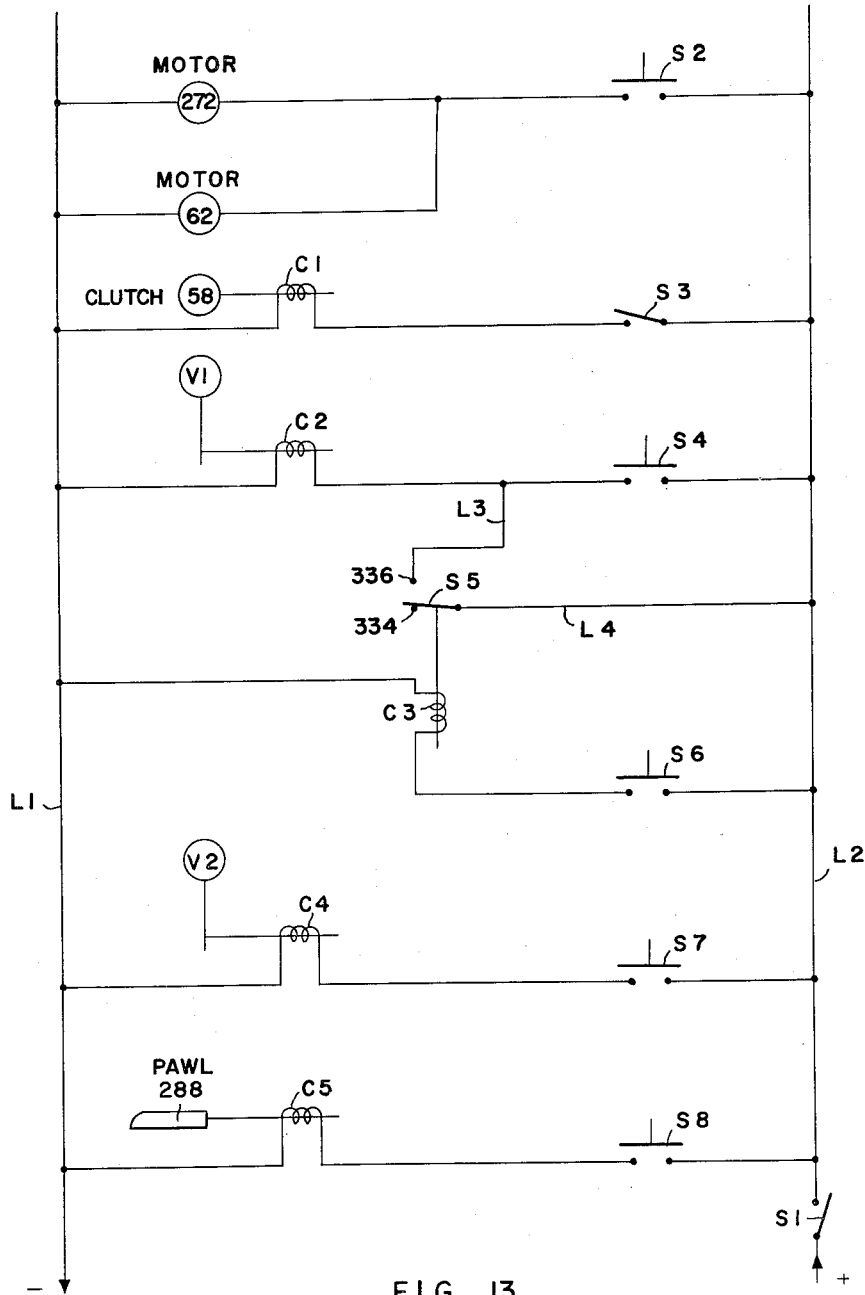
FIGURE 13 is a wiring diagram.

Referring particularly to FIGURES 7, 8 and 9, at each end of a folder is a bearing unit, generally designated 92, having a vertically extending body 94 and a horizontally extending base 96 adjustably secured in position by anchor bolts 98 which project through an elongated opening 100 formed in the plate 89. Each folder includes a frame 102 comprising a horizontally extending mandrel abutting bar 104, a laterally spaced folder bar 105 and a spacer bar 106. The opposite end portions of each of these bars are affixed to end plates 108 generally triangular in shape. Affixed to each end plate 108 is a pivot pin 110 journalled in the bearing body 94 and mounting a collar 112 to which is secured one end of a tension spring 114 which is anchored by its opposite end to the base 96. Referring particularly to FIGURE 8, the tension spring 114 biases the folder frame in a counterclockwise direction. The movement of the frame is limited by engagement of the edge of the end plate 108 with a stop pin 116.

The machine is provided with an indexing assembly comprising a vertically extending tubular center column 118 which mounts a head 120. A lower end portion of the column 118 is slidably projected through a flanged sleeve bearing 122 carried by a horizontally extending plate 124 supported on horizontally extending bars 126 each carried by a bent 72. An intermediate portion of the column 118 is slidably projected through a flanged sleeve bearing 128 carried by a horizontally extending plate 130 supported upon a pair of horizontally extending bars respectively carried by the bents 72.

Figure 5:
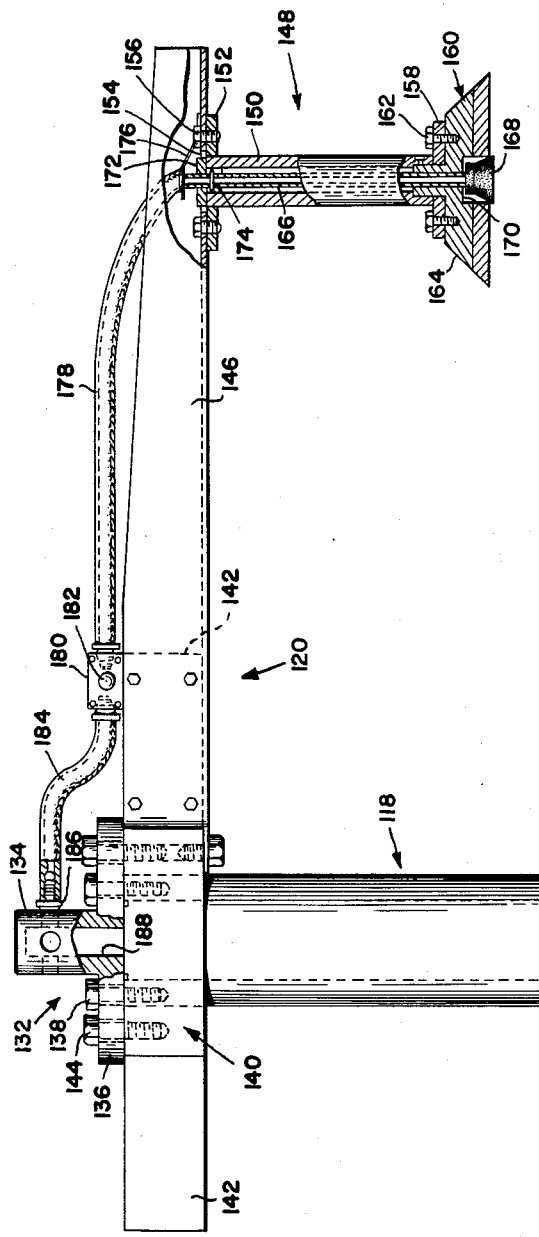
FIGURE 5 is an elevation of the center column and the head carried thereby, only one arm being shown, and parts being broken away and sectioned to clarify certain details.
Figure 6:
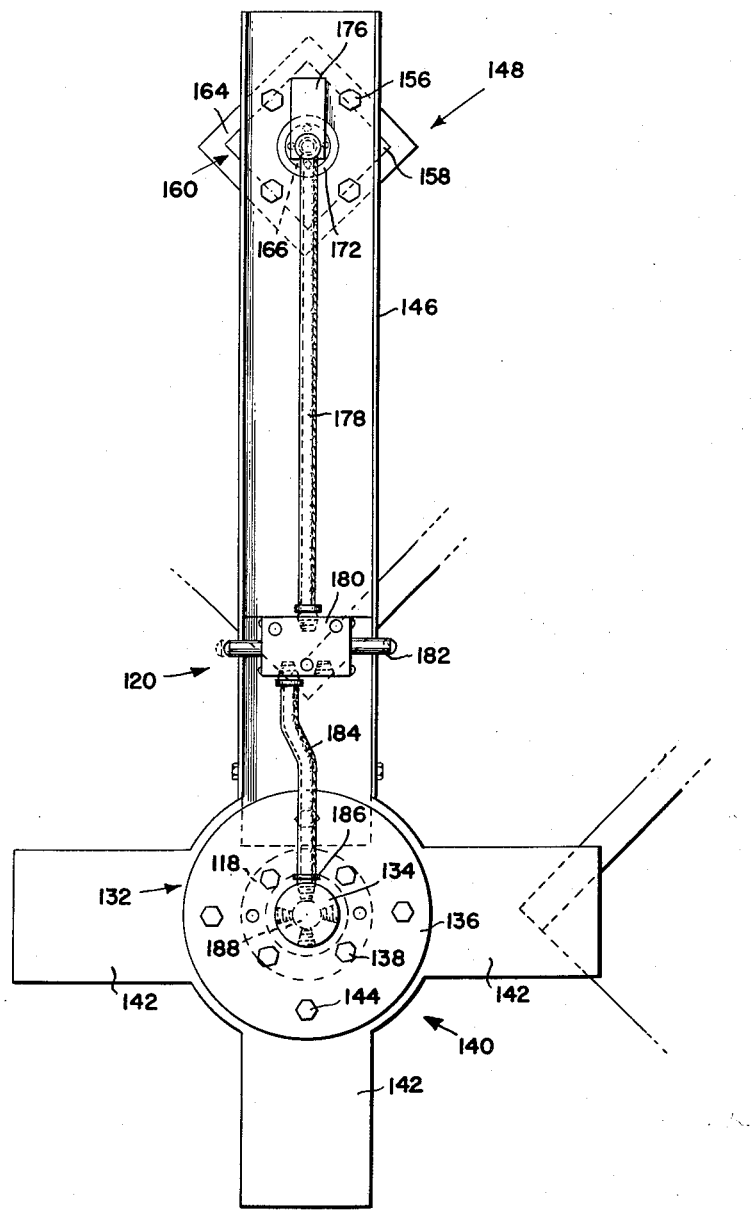
FIGURE 6 is a plan view of the head shown in FIGURE 5.

Referring particularly to FIGURES 5 and 6, overlying the upper end portion of the column 118 is a cap 132 having a body 134 and a flange 136 affixed to the upper end portion of the column 118 by studs 138. Fitted over the upper end portion of the column 118 and underlying the cap 132 is a collar 140 having four radial extensions angularly spaced equally about the collar. The collar is affixed to the cap 132 by studs 144. Extending outwardly from each of the radial extension 142 is an arm 146 generally U-shaped in transverse section and having an inner end portion bolted to the radial extension 142.

Depending from the outer end portion of the arm 146 is a pickup assembly, generally designated 148. This assembly comprises a tubular member 150 provided with a flange 152 at its upper end. This flange 152 underlies an area of the arm 146 apertured, as at 154, and is secured to said area by studs 156. The lower end portion of the member 150 is provided with a flange 158 which carries a mandrel 160 secured in position by studs 162. The mandrel is provided with four sloping sides 164 each making an angle of approximately 60 degrees with the undersurface of the mandrel. Within the member 150 is a second tubular member mounting upon the lower end portion thereof a vacuum cup 168 which is disposed in a depression 170 formed in the undersurface of the mandrel. Across the upper end of the member 150 is a plate 172 through which slidably projects the upper end portion of the member 166, which upper end portion is provided with a stop ring 174. The upper terminal portion of the member 166 is affixed to one end of a leaf spring 176 carried by the arm 146. Connected with the upper end portion of the member 166 is a section of flexible hose 178. The free end portion of this hose section is connected to a valve 180, which valve is provided with an axially shiftable spool 182. A second section of flexible hose 184 is connected to the valve 180 and is provided with a fitting 186 through which the interior of the hose is placed in communication with a center bore 188 formed in the cap body 134.

The lower end portion of the column 118 is counterbored, as at 190, to form a shoulder 192 against which is a ring 194 accommodating a rotating pressure joint 196 having a lateral extension 198. This extension works upon a pin 200 which is affixed by a bar 202 to a bed frame member 204. Extending from the joint 196 is a line 206 to a vacuum pump (not shown). Fitted over a lower end portion of the column 118 is a chain sprocket 208 overlying the sleeve bearing 112. Overlying the sprocket 208 is a radially extending spline 210 clamped to the sprocket 208 by a ring 212. Overlying the ring 212 is a plate 214 affixed to a pair of horizontally extending bars 216 each carried by a bent 72. Embedded in the column 118 is an insert 218 having a way 220. The inner end portion of the spline 210 works in the way 220.

Fitted over the column 118 is a collar 224 bearing pivots 226 to which is secured a bifurcated end 228 of a lever 230. This lever is pivoted, as at 232, to a bearing 234 carried by a pair of horizontally extending bars 236 each carried by a frame section 72. The opposite end portion 238 of the lever 230 is bifurcated and connected, as at 240, to a member 242 mounted upon the end of a piston rod 244 associated with an air cylinder 246, which cylinder is pivoted, as at 248, to a support 250 affixed to the bed frame section 12.

Affixed to the bars 216, as by bolts 252, is a horizontally extending plate 254, and affixed to the angles 126, as by bolts 256, is a horizontally extending plate 258. A vertically extending shaft 260 has opposite end portions extending respectively through the plates 254 and 258, the shaft being secured against axial shifting movement by a pair of collars 262. Mounted upon the shaft 260 is a torque limiter clutch 264, which clutch has associated therewith a chain sprocket 266. Overlying the clutch 264 is a chain sprocket 268 and intervening this chain sprocket and the overlying plate 254 is a spacer sleeve 270. Mounted upon the base frame section 12 is a unit including a motor 272 and a change speed device 274. The output shaft of the change speed device mounts a chain sprocket 276, and trained over this sprocket and the sprocket 268 is a drive chain 278. Trained over the sprockets 226 and 208 is a drive chain 280.

The column 118 mounts a cam 282 affixed to the column by a key 283. Each quadrant of the cam is provided with a cam surface 284 terminating in a radially extending shoulder 286. Associated with the cam 282 is a pawl 288 pivoted at 290 to the plunger 292 of a solenoid 294. For guiding the pawl 288 there is provided a bearing block 296 through which the pawl extends. Secured to the bearing block 296 are corresponding end portions of a pair of tension springs 298. The other corresponding end portions of these springs are secured to a pin 300 carried by the pawl, thus the pawl is biased axially toward cam 282, its movement being limited by a stop 302 which engages the bearing block 296. Slidably projecting into the bearing block 296 and engaging the pawl is one end portion of a rod 304, the other end portion of this rod is slidably received by a bearing 306. the rod is provided with a collar 308 and interposed between this collar and the bearing 306 is a compression spring 310. The end of the rod 304 projecting through the bearing 306 is adapted to engage a switch S6. The switch S6, bearing 306 and bearing block 296 are mounted upon a horizontally extending bar 314 having opposite end portions secured respectively to post 80 of the frame sections 72. The solenoid 294 is mounted upon horizontally extending bars 315 carried by vertically extending bars 317 each of which is carried by a horizontally extending bar 216 and a horizontally extending bar 236.

Referring particularly to Figure 1, a hose 316 is attached to a nozzle 318 carried by a bracket 320. Two such nozzles are provided and each is directed downwardly. In addition, a cam 322 carried by the post 22, is provided, which cam is adapted for operating the spools 182 of the valves 180. Still further, a conveyor is provided having a belt 324 for carrying the finished work away from the machine.

Referring to the wiring diagram, switches S1 and S2 are normally open manually operated switches located in the front of the machine within easy reach of the operator. Switch S3 is mounted upon a bracket 326 and is provided with an arm 328. This switch is a normally open switch operated by the blanks acting on the arm 328. The switch closes momentarily when operated. The switch S4 is a normally open manually operated switch which closes momentarily. It is mounted in the front of the machine within easy reach of the operator. The switch S5 is solenoid operated. Switch S6 is a normally open switch which closes momentarily when operated by the pawl. Switches S7 and S8 are normally open switches which close momentarily when operated by the lateral extension 330 of the member 242. C1 is the coil of the magnetic clutch 56. C3 is the coil of the solenoid operated switch S5. C2 and C4 are the coils respectively of the solenoid operated valves V1 and V2. C5 is the coil of the solenoid operated pawl 288. V1 is a solenoid operated valve which controls the supply of air to the lower end of the cylinder 246, being spring biased to one position. Valve V2 is a solenoid operated valve controlling the supply of air to the upper end of the cylinder 246, being spring biased to one position.

Switch S1 is connected in a main lead L2. Motors 62 and 272 are connected in parallel with each other and in series with normally open switch S2 across the lead L2 and a main lead L1. Coil C1 and normally open switch S3 are connected in series across the leads L1 and L2. Coil C2 and normally open switch S4 are connected in series across the leads L1 and L2. Coil C3 and normally open switch S6 are connected in series across the leads L1 and L2. Also contacts at 336 are connected by a lead L3 between switch S4 and coil C2. Closed contacts at 334 are connected through the switch S5 and a lead L4 to the lead L2. Coil C4 and normally open switch S7 are connected in series across the leads L1 and L2. Coil C5 and normally open switch S8 are connected in series across the lead L1 and L2.

Figure 4:
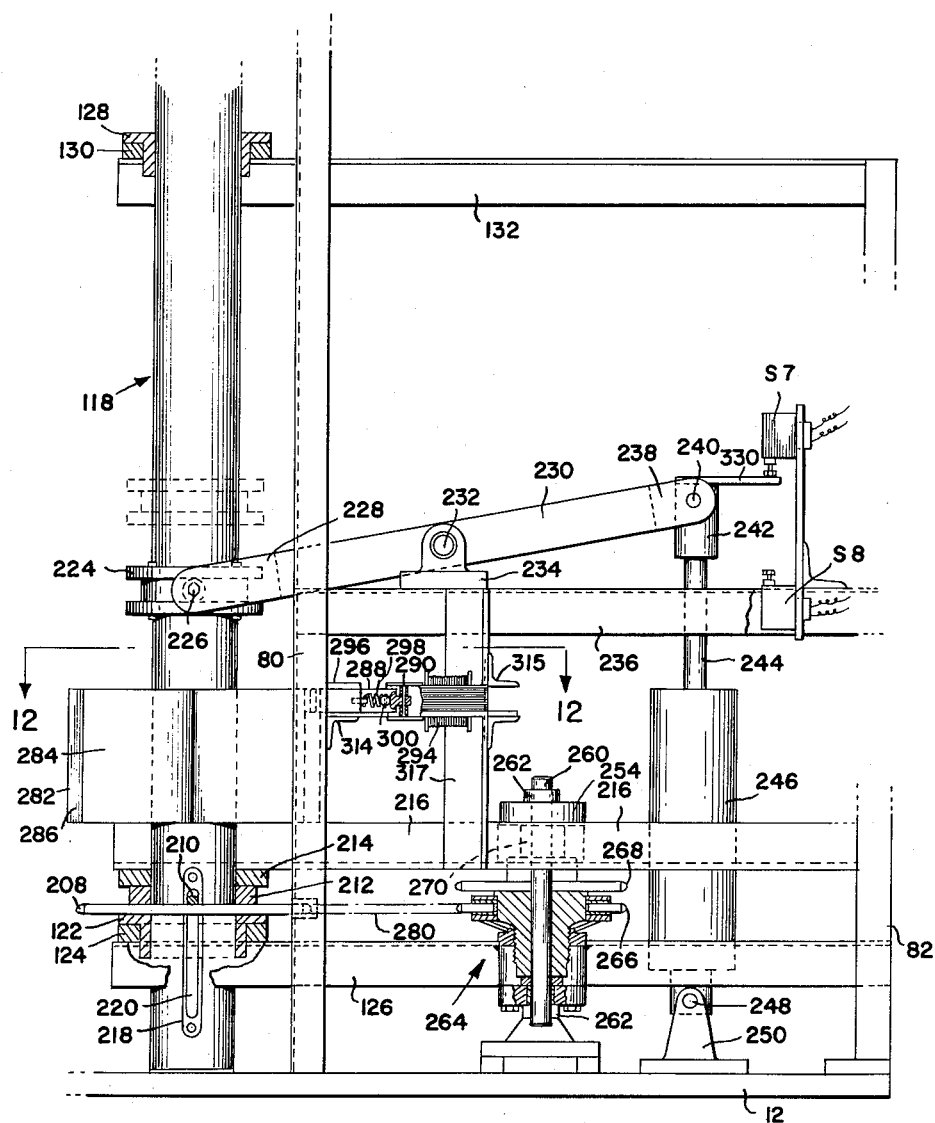
FIGURE 4 is an enlarged section on the vertical plane indicated by line 4—4 of FIGURE 1.

In the operation of the machine, cornered and scored blanks, designated A, are stacked upon the elevator platform 49 with corresponding side panels between the two guides 68, as shown in Figure 1. Switch S3 is adjusted so that its arm 328 overhangs the topmost blank. When the cycle begins the center column 118 is in elevated position. Air under pressure is supplied to the bottom of cylinder 246, whereupon piston rod 244 is extended and the lever 230 turns counterclockwise, as viewed in Figure 4, about pivot 232. Thus the center column is shifted downwardly to the position shown in Figures 4 and 5.

The center column has a sliding fit in the sleeve bearings 122 and 128, sprocket 208, ring 212 and plate 214. The inner end of the spline 210 works freely in the way 220.

The pressure joint 196 moves downwardly with the center column with the lateral extension 198 thereof sliding downwardly on the pin 200.

As the arms 146 move downwardly with the center column, the arm at the loading station, that is the arm overhanging the elevator platform 49, moves downwardly and one end of the spool 182 of the associated valve 180 engages cam 322 and is shifted axially to open position. As the pickup assembly carried by the arm approaches the underlying stack of blanks, the vacuum cup 168 engages the blank and shortly thereafter the undersurface of the mandrel 160 engages the blank, the tube 166 yielding axially against the influence of the spring 176, and the ring 174 limiting such axial movement.

As the arm 146 at the first folding station, that is the arm overhanging the portion of the machine directly to the rear of the loading station, moves downwardly, a blank B, picked up at the loading station during the last preceding cycle of the machine, is lowered onto the underlying folders 90. On each of two opposite sides of the blank the center panel of the blank engages the bar 104 of the associated folder and the side panel engages the bar 105 of the associated folder. The score line being located between the bars 104 and 105. As downward movement continues the mandrel pushes bars 104 downwardly, swinging the frames 102 in opposite direction about pivots 110 against the influence of tension springs 114. Thus the bars 105 fold up one pair of opposite side panels of the blank over the sloping sides of the mandrel. The other pair of side panels pass freely between the bars 105 and are not folded at the first folding station.

As the arm at the second folding station, that is the arm overhanging the portion of the machine directly to the rear of the conveyor, moves downwardly, a blank C, having two opposite side panels folded up at the first folding station during the last preceding cycle of the machine, is lowered onto the second set of folders 90. Jets of air from the nozzles 318 unfold the side panels so that they cannot interfere with the folding up of the second pair of opposite side panels. The folding of the second pair of opposite side panels at the second folding station is effected in the manner already described in connection with the folding of the first pair of opposite side panels at the first folding station.

As the arm 146 at the eject station, that is the arm overhanging the conveyor, moves downwardly, a blank D, having its second pair of opposite side panels folded up at the second folding station during the last preceding cycle of the machine, is lowered to conveyor belt 324. As the pickup assembly 148 approaches the belt, the spool 182 again engages the cam 322 and is closed, in consequence of which the vacuum is removed and the box released for gravity discharge onto the belt 324.

Air is now supplied to the upper end of cylinder 246, whereupon piston rod 244 is retracted. The lever 230 turns clockwise and shifts the center column 118 upwardly.

As the arm at the loading station rises, it lifts a blank A from the stack of blanks carried by the elevator platform 49. As the blank passes switch S3 it operates arm 328, as a consequence of which the shaft 42 is momentarily clutched to constantly running motor 62. Shaft 26 is actuated through chain drive 55 and gears 50, 51. Platform 49 is raised a distance equal to the thickness of a blank.

At the first and second folder stations, as the mandrels rise, the folder frames 102 pivot back to their initial positions under the influence of springs 114, movement being limited by engagement of the end plates 108 with stops 116. At the eject station the unloaded arm is raised.

With the center column raised, pawl 288 is retracted against springs 298, whereupon it pivots about the pivot element 290 under the influence of the pressure rod 304. The clutch 264 engages and through the chain drives 278 and 280 the center column and the cam mounted thereon are actuated.

Pawl 288 rides on the surface 284 of the cam 282 and is finally engaged by the next shoulder 286, whereupon the pawl 288 is pivoted back to its initial position. As a consequence, the rod 304 is shifted axially against the influence of the compression spring 310 and operates the switch S6, whereupon air is again supplied to the lower end of the cylinder 246 to start a new cycle of the machine automatically. It is not necessary to again press switch S4 to start the next cycle of the machine.

When the stack of blanks placed on the platform 49 is exhausted, the hand wheel 32 may be operated to return the platform 49 to its initial position, whereupon the platform is reloaded with a fresh stack of blanks. This may be done without shutting down the machine.

It will be noted that the brackets 66 may be adjusted relative to one another to accommodate different sizes of blanks. In addition, the bracket 326 is adjustable for positioning the switch S3 properly.

In the event of a change over from one size or shape of blank to another size or shape of blank, the folders 90 may be shifted laterally relative to one another to accommodate the new work. The mandrels must be changed, but not the folders 90. It is merely necessary to reposition these folders, and to facilitate repositioning the folders, gauges 332 are provided.

It will be observed that the nozzles 318 are open continuously. With regard to the valves 180, these go through a complete cycle with each full revolution of the center column 118. Each valve opens shortly after the cycle begins and closes shortly before the cycle ends.

Referring again to the wiring diagram, when it is desired to operate the machine, switch S1 is closed to make electric power available. The switch S2 is then closed. This furnishes power to the motors 62 and 272, which run continuously. To start the first cycle of the machine the switch S4 is closed manually. This switch remains closed for a moment and then automatically reopens. While it is closed, the coil C2 is energized and operates valve V1 against its spring bias, and air is supplied to the lower end of cylinder 246. When switch S4 reopens, coil C2 is deenergized, and valve V1 recloses under the influence of its spring bias. Thus rod 244 is extended and the lateral extension 330 operates switch S7.

Switch S7 remains closed for a moment and then automatically reopens. While closed, coil C4 is energized and operates valve V2 against its spring bias, and air is supplied to the upper end of cylinder 246. When switch S7 reopens, coil C4 is deenergized and valve V2 recloses under the influence of its spring bias. Thus rod 244 is retracted and lateral extension 330 operates switch S8.

Switch S8 remains closed for a moment and then automatically reopens. While closed, coil C5 is energized and operates plunger 292 of solenoid 294 and retracts pawl 288. When switch S8 reopens the solenoid is deenergized and pawl 288 is released. The end of the pawl engages the cam surface 284 and remains engaged therewith for one-quarter of a revolution of the center column.

When the center column has indexed 90 degrees, switch S6 is operated by the pawl 288 as the latter engages the next shoulder of cam 282. Switch S6 remains closed for a moment and then automatically reopens. While closed, coil C3 is energized and operates switch S5. The contacts at 334 open and the contacts at 336 close. When switch S6 reopens, coil C3 is deenergized, as a consequence of which the contacts at 336 reopen and those at 334 reclose. While the contacts are closed at 336 a pulse of current passes through the lead L4, switch S5 and lead L3 to the coil C2, which is energized to start the next cycle of the machine.

Switch S3 is operated by the blanks A as they are lifted one by one from the stack thereof. This switch remains closed for a moment and then reopens. While closed, coil C1 of clutch 58 is energized, whereupon the shaft 42 is clutched to the motor 62 and turns. When switch S3 reopens, coil C1 is deenergized and shaft 42 is declutched. This momentary clutching of shaft 42 is sufficient to actuate the elevating mechanism to raise the stack of blanks a distance equal to the thickness of one blank.

It will be noted that once during each cycle of the machine the center column is lowered from fully raised or indexing position to fully lowered or pickup position, raised to its initial position and then indexed 90 degrees.

It will be understood, of course, that the present invention, as shown and described, is susceptible of various changes and modifications without departing from the principles of the present invention. Accordingly, it is intended to claim the present invention broadly as well as specifically as indicated in the appended claims.

What is claimed is:

1. In a multi-station machine for folding up the side panels of box blanks cornered and scored for folding, the combination comprising an assembly including a column member, a plurality of arms extending radially outwardly from said member, and a plurality of mandrels depending respectively from said arms, folder means disposed respectively at a plurality of fixed stations each underlying one of said arms, and means operable for repeatedly lowering said assembly from indexing position to working position and raising it again and then indexing said assembly one station thereby to progressively advance the work from station to station, the folder means at each of said stations including a pair of frames respectively underlying opposite side areas of the associated mandrel and mounted for being rocked in opposite directions when engaged by the overlying mandrel thereby to swing remote sides of the frames over and into engagement with the opposite sides of the mandrel.

2. In a multi-station machine for folding up the side panels of box blanks cornered and scored for folding, the combination comprising an assembly including a column member, a plurality of arms extending radially outwardly from said member, and a plurality of mandrels depending respectively from said arms, folder means disposed respectively at a plurality of fixed stations each underlying one of said arms, and means operable for repeatedly lowering said assembly from indexing position to working position and raising it again and then indexing said assembly one station thereby to progressively advance the work from station to station, the folder means at each of said stations including a pair of frames respectively underlying opposite side areas of the associated mandrel, each of said frames having a pair of opposite side bars parallel to the associated edge of the mandrel, said frames being rockable in opposite directions about axes parallel to said mandrel edges when the proximate ones of said bars are engaged by the overlying mandrel thereby to swing the remote ones of said bars upwardly over and into engagement respectively with the opposite sides of the mandrel.

3. In a multi-station machine for folding up the side panels of box blanks cornered and scored for folding, the combination comprising an assembly including a column member, a plurality of arms extending radially outwardly from said member, and a plurality of mandrels depending respectively from said arms and having horizontally extending undersurfaces, folder means disposed respectively at a plurality of fixed stations each underlying one of said arms, and means operable for repeatedly lowering said assembly from indexing position to working position and raising it again and then indexing said assembly one station thereby to progressively advance the work from station to station while detachably secured to the undersurfaces of said mandrels, the folder means at each of said stations including a pair of horizontally disposed frames respectively underlying opposite side areas of the associated mandrel and mounted for being rocked about horizontal axes in opposite directions when engaged by the overlying mandrel thereby to swing remote sides of the frames over and into engagement with the opposite sides of the mandrel.

4. In a multi-station machine for folding up the side panels of box blanks cornered and scored for folding, the combination comprising an assembly including a column member, a plurality of arms extending radially outwardly from said member, and a plurality of mandrels depending respectively from said arms and having horizontally extending undersurfaces of a size and shape for registering with the center panels of the blanks, folder means disposed respectively at a plurality of fixed stations each underlying one of said arms, and means operable for repeatedly lowering said assembly from indexing position to working position and raising it again and then indexing said assembly one station thereby to progressively advance the work from station to station while detachably secured to the undersurfaces of said mandrels, the folder means at each of said stations including a pair of horizontally disposed frames respectively underlying opposite side areas of the associated mandrel, each of said frames having a pair of horizontally extending opposite side laterally spaced bars parallel to the associated edge of the mandrel, said frames being rockable in opposite directions about horizontally extending axes parallel to said mandrel edges when the proximate ones of said bars are depressed by the overlying mandrel thereby to swing the remote ones of said bars upwardly in an arc in blank folding direction and into engagement with the opposite sides of the mandrel.

5. In a multi-station machine for folding up the side panels of box blanks cornered and scored for folding, the combination comprising an assembly including a column member, a plurality of arms extending radially outwardly from said member, and a plurality of mandrels depending respectively from said arms at a fixed distance from the center of said member and mounted for being replaced by mandrels of a different size, folder means disposed respectively at a plurality of fixed stations each underlying one of said arms, and means operable for repeatedly lowering said assembly from indexing position to working position and raising it again and then indexing said assembly one station thereby to progressively advance the work from station to station, the folder means at each of said stations including a pair of frames respectively underlying opposite side areas of the associated mandrel and mounted for being rocked in opposite directions when engaged by the overlying mandrel thereby to swing remote sides of the frames over and into enengagement with the opposite sides of the mandrel, and means mounting said pair of frames for shifting movement of either frame as a unit laterally relative to the other frame for accommodating a change over from mandrels of one size to mandrels of a different size.

6. In a multi-station machine for folding up the side panels of box blanks cornered and scored for folding, the combination comprising an assembly including a column member, a plurality of arms extending radially outwardly from said member, and a plurality of mandrels depending respectively from said arms at a fixed distance from the center of said member and mounted for being replaced by mandrels of a different size, folder means disposed respectively at a plurality of fixed stations each underlying one of said arms, and means operable for repeatedly lowering said assembly from indexing position to working position and raising it again and then indexing said assembly one station thereby to progressively advance the work from station to station, the folder means at each of said stations including a pair of folders respectively underlying opposite side areas of the associated mandrel, each of said folders including a frame having a pair of opposite side bars parallel to the associated edge of the mandrel, and a pair of bearing units respectively at opposite ends of said frame and rockably mounting the latter, said frames being rockable in opposite directions about axes parallel to said mandrel edges when the proximate ones of said bars are engaged by the overlying mandrel thereby to swing the remote ones of said bars upwardly over and into engagement respectively with the opposite sides of the mandrel, and means adjustably fixing said bearing units in position to permit shifting either of said folders as a unit laterally relative to the other for accommodating a change from mandrels of one size to mandrels of a different size.

7. In a multi-station machine for folding up the side panels of box blanks cornered and scored for folding, the combination comprising an assembly including a column member, a plurality of arms extending radially outwardly from said member, and a plurality of mandrels depending respectively from said arms and having horizontally extending undersurfaces of a size and shape for registering with the center panels of the blanks, and upwardly and inwardly sloping sides, folder means disposed respectively at a plurality of fixed stations each underlying one of said arms, and means operable for repeatedly lowering said assembly from indexing position to working position and raising it again and then indexing said assembly one station thereby to progressively advance the work from station to station, the folder means at each of said stations including a pair of frames respectively underlying opposite side areas of the associated mandrel and mounted for being rocked in opposite directions when engaged by the overlying mandrel thereby to swing remote sides of the frames over and into engagement with the sloping opposite sides of the mandrel.

8. In a multi-station machine for folding up the side panels of box blanks cornered and scored for folding, the combination comprising an assembly including a column member, a plurality of arms extending radially outwardly from said member, and a plurality of mandrels depending respectively from said arms and each having a horizontally extending undersurface of a size and shape for registering with the center panel of a blank, and sides sloping upwardly and inwardly at an angle of approximately 60 degrees from the undersurface of the mandrel, folder means disposed respectively at a plurality of fixed stations each underlying one of said arms, and means operable for repeatedly lowering said assembly from indexing position to working position and raising it again and then indexing said assembly one station thereby to progressively advance the work from station to station, the folder means at each of said stations including a pair of frames respectively underlying opposite side areas of the associated mandrel, each of said frames having a pair of opposite side bars parellel to the associated edge of the mandrel, said frames being rockable in opposite directions about axes parallel to said mandrel edges when the proximate ones of said bars are engaged by the overlying mandrel thereby to swing the remote ones of said bars upwardly over and into engagement respectively with the sloping opposite sides of the mandrel for overfolding the side panels of the blank approximately 120 degrees.

9. In a multi-station machine for folding up the side panels of box blanks cornered and scored for folding, the combination comprising an assembly including a column member, a plurality of arms extending radially outwardly from said member, and a plurality of mandrels depending respectively from said arms, means disposed respectively at a plurality of fixed stations each underlying one of said arms, said means including at a first one of said stations means for feeding said blanks from a stack thereof, and at a plurality of others of said stations means for folding said blanks, means operable for repeatedly lowering said assembly from indexing position to working position and raising it again and then indexing said assembly one station thereby to progressively advance the work from station to station, suction means associated with said mandrels and operable for picking up blanks from said stack, releasably holding them to said mandrels and releasing them at a last one of said stations, and means for advancing said blank feeding means in predetermined timed relation to said assembly actuating means, the folder means at each of said stations including a pair of frames respectively underlying opposite side areas of the associated mandrel and mounted for being rocked in opposite directions when engaged by the overlying mandrel thereby to swing remote sides of the frames over and into engagement with the opposite sides of the mandrel.

10. In a multi-station machine for folding up the side panels of box blanks cornered and scored for folding, the combination comprising an assembly including a column member, a plurality of arms extending radially outwardly from said member, and a plurality of mandrels depending respectively from said arms, means disposed respectively at a plurality of fixed stations each underlying one of said arms, said means including at a first one of said stations an elevator for feeding said blanks from a stack thereof, and at a plurality of others of said stations folder frames for folding said blanks, power devices operable for repeatedly lowering said assembly from indexing position to working position and raising it again and then indexing said assembly one station thereby to progressively advance the work from station to station, valved suction devices associated with said mandrels, said valves being operable for controlling the suction at each mandrel independently of that at the other mandrels, a cam responsive to lowering of said assembly for opening one of said valves and closing another for picking up blanks from said stack, releasably holding them to said mandrels and then releasing them, and means for advancing said blank feeding elevator in predetermined timed relation to said power devices, the folder frames at each of said stations respectively underlying opposite side areas of the associated mandrel and being mounted for being rocked in opposite directions when engaged by the overlying mandrel thereby to swing remote sides of the frames over and into engagement with the opposite sides of the mandrel.

11. In a multi-station machine for folding up the side panels of box blanks cornered and scored for folding, the combination comprising a mandrel, said mandrel including a blank engaging bottom face and a plurality of side faces, each side face forming an acute angle with said bottom face, a carriage for said mandrel, folder means disposed respectively at a plurality of stations, means for indexing said carriage and mandrel from station to station, and means for advancing said mandrel toward said folder means at each folding station, the folder means at each station including a substantially rigid folder frame underlying one side of said mandrel and mounted for being rocked by said mandrel for swinging over and into engagement with the associated side of said mandrel.

12. In a multi-station machine for folding up the side panels of box blanks cornered and scored for folding, the combination comprising a mandrel, said mandrel including a blank engaging bottom face and a plurality of side faces, each side face forming an acute angle with said bottom face, a carriage for said mandrel, folder means disposed respectively at a plurality of stations, means for indexing said carriage and mandrel from station to station, and means for advancing said mandrel toward said folder means at each folding station, the folder means at each station including a substantially rigid folder frame underlying one side of said mandrel, and spring means yieldably biasing said folder frame to non-folding position, said folder frame being rockably mounted, and being rockable by said mandrel against the influence of said spring means for swinging over and into engagement with the associated side of the mandrel into folding position.

13. In a four-station machine for folding up the side panels of box blanks cornered and scored for folding, the combination comprising a mandrel, said mandrel including a blank engaging bottom face and a plurality of side faces, each side face forming an acute angle with said bottom face, a carriage for said mandrel, folder means disposed respectively at two of said stations, means for indexing said carriage and mandrel from station to station, and means for advancing said carriage and mandrel toward said folder means at each folding station, the folder means at each station including a pair of folder frames adapted for respectively underlying opposite sides of said mandrel and mounted for being rocked by said mandrel for swinging over and into engagement respectively with the opposite sides of said mandrel.

14. In a four-station machine for folding up the side panels of box blanks cornered and scored for folding, the combination comprising a mandrel, said mandrel including a blank engaging bottom face and a plurality of side faces, each side face forming an acute angle with said bottom face, a carriage for said mandrel, folder means disposed respectively at two of said stations, means for indexing said carriage and mandrel from station to station, and means for advancing said carriage and mandrel toward said folder means at each folding station, the folder means at each station including a pair of folder frames adapted for respectively underlying opposite sides of said mandrel, and spring means yieldably biasing said folder frames to non-folding positions, said folder frames being rockably mounted, and being rockable by said mandrel against the influence of said spring means for swinging over and into engagement respectively with the opposite sides of said mandrel.

15. In a four-station machine for folding up the side panels of box blanks cornered and scored for folding, the combination comprising a carriage having four arms extending respectively over said stations, a mandrel depending from each of said arms over one of said stations, said mandrel including a blank engaging bottom face and a plurality of side faces, each side face forming an acute angle with said bottom face, means for releasably holding a blank to each of said mandrels, folder means disposed at two of said stations, means for indexing said carriage and mandrels to move blanks held by said mandrels from station to station, and means for advancing said carriage and mandrels toward the folder means at each folding station to fold the blanks held by said mandrels, the folder means at each folding station including a pair of folder frames adapted for respectively underlying opposite sides of said mandrel for swinging over and into engagement respectively with the opposite sides of said mandrel.

16. In a four-station machine for folding up the side panels of box blanks cornered and scored for folding, the combination comprising a carriage having four arms extending respectively over said stations, a mandrel depending from each one of said arms over one of said stations, said mandrel including a blank engaging bottom face and a plurality of side faces, each side face forming an acute angle with said bottom face, suction means for releasably holding a blank to each of said mandrels, folder means disposed at two successive ones of said stations, means for indexing said carriage and mandrels to move blanks held by said mandrels from a first one of said stations, through said folding stations to a last one of said stations, means for advancing said carriage and mandrels toward the folder means at each folding station to fold the blanks held by said mandrels, and means for automatically initiating said suction at said first station and terminating the same at said last station, the folder means of each folding station including a pair of folder frames adapted for respectively underlying opposite sides of said mandrel and mounted for being rocked by said mandrel for swinging over and into engagement respectively with the opposite sides of said mandrel.

17. In a multi-station machine for folding up the side panels of box blanks cornered and scored for folding, the combination comprising a mandrel, said mandrel including a blank engaging bottom face and a plurality of side faces, each side face forming an acute angle with said bottom face, a carriage for said mandrel, folder means disposed respectively at a plurality of stations, means for indexing said carriage and mandrel from station to station, and means for advancing said mandrel toward said folder means at each folding station, the folder means at each station including a pair of pivotally mounted frames underlying opposite sides of said mandrel, each of said frames including a mandrel abutment means and side panel folder means spaced therefrom the pivotal axis of each of said frames lying between said mandrel abutment means and said side panel folder means.

18. In a machine for folding up the side panels of box blanks cornered and scored for folding, the combination comprising a mandrel including a blank engaging bottom face and a plurality of side faces, each side face forming an acute angle with said bottom face, folder means disposed beneath said mandrel, and means for advancing said mandrel toward said folder means, the folder means including a pair of pivotally mounted frames underlying opposite sides of said mandrel, an abutment bar on each frame and disposed in the path of movement of said mandrel, and a folder bar on each frame spaced from said abutment bar and lying outside the path of movement of said mandrel, the pivotal axis of each of said frames lying between said abutment bar and said folder bar.

References Cited in the file of this patent
UNITED STATES PATENTS

| | | |
|---|---|---|
| 1,348,369 | Morrison | Aug. 3, 1920 |
| 2,081,910 | Coppins | June 1, 1937 |
| 2,516,624 | Guyer | July 25, 1950 |
| 2,600,954 | Bardet | June 17, 1952 |
| 2,834,261 | Goss | May 13, 1958 |
| 2,954,725 | Palmer | Oct. 4, 1960 |